US008818659B2

(12) United States Patent
Sujan et al.

(10) Patent No.: US 8,818,659 B2
(45) Date of Patent: *Aug. 26, 2014

(54) SUPERVISORY THERMAL MANAGEMENT SYSTEM AND METHOD FOR ENGINE SYSTEM WARM UP AND REGENERATION

(71) Applicant: Cummins Intellectual Property, Inc., Minneapolis, MN (US)

(72) Inventors: Vivek A. Sujan, Columbus, IN (US); Phani Vajapeyazula, Columbus, IN (US); Kenneth Follen, Greenwood, IN (US); An Wu, Columbus, IN (US); Barty L. Moffett, Seymour, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,367

(22) Filed: Oct. 25, 2013

(65) Prior Publication Data
US 2014/0052353 A1 Feb. 20, 2014

Related U.S. Application Data

(63) Continuation of application No. 13/345,642, filed on Jan. 6, 2012, now Pat. No. 8,577,568.

(60) Provisional application No. 61/430,430, filed on Jan. 6, 2011, provisional application No. 61/431,290, filed on Jan. 10, 2011, provisional application No. 61/431,291, filed on Jan. 10, 2011.

(51) Int. Cl.
| | |
|---|---|
| *G06F 7/00* | (2006.01) |
| *F02D 41/02* | (2006.01) |
| *B60W 50/14* | (2012.01) |
| *B60W 30/194* | (2012.01) |
| *F02D 41/14* | (2006.01) |
| *B60W 10/06* | (2006.01) |
| *B60W 10/11* | (2012.01) |
| *F16H 61/02* | (2006.01) |
| *F16H 61/00* | (2006.01) |
| *F02D 41/40* | (2006.01) |

(52) U.S. Cl.
CPC ....... *B60W 10/06* (2013.01); *B60W 2510/1005* (2013.01); *F02D 41/029* (2013.01); *F16H 2061/0232* (2013.01); *B60W 50/14* (2013.01); *B60W 30/194* (2013.01); *F16H 2061/0015* (2013.01); *F02D 41/1447* (2013.01); *F02D 2041/1412* (2013.01); *B60W 10/11* (2013.01); *F02D 41/0235* (2013.01); *F02D 2200/701* (2013.01); *F02D 41/405* (2013.01); *F02D 41/024* (2013.01); *F16H 61/0213* (2013.01); *Y02T 10/76* (2013.01); *B60W 2710/0694* (2013.01)
USPC ............... 701/53; 701/51; 701/101; 701/102; 701/103

(58) Field of Classification Search
USPC ............................ 701/51, 53, 101, 102, 103
See application file for complete search history.

(56) References Cited

U.S. PATENT DOCUMENTS
4,368,509 A 1/1983 Li
(Continued)

OTHER PUBLICATIONS
The International Search Report and the Written Opinion of the International Search Authority dated May 1, 2012; International Application No. PCT/US2012/020559.

*Primary Examiner* — Calvin Cheung
(74) *Attorney, Agent, or Firm* — Foley & Lardner LLP (57) ABSTRACT

This disclosure provides a thermal management system and method that can recommend operational behavior to an operator of an engine system to optimize fuel economy over a period of time in which a components of the engine system is in a warm up and/or regeneration state. In one representative embodiment, the expected temperature change of the engine component at a later time is determined based on inefficient operation of the engine, such as a transmission down shift resulting in higher engine speed and lower engine torque, and the expected temperature change of the engine component resulting from operating the engine under current conditions or expected conditions at that later time is determined. A determination is made as to whether the inefficient engine operation is the optimal operation in view of fuel economy and a recommendation is generated for the operator based if optimal operation is determined.

20 Claims, 6 Drawing Sheets

(56) References Cited

U.S. PATENT DOCUMENTS

| | | | |
|---|---|---|---|
| 4,505,169 | A | 3/1985 | Ganoung |
| 5,231,897 | A | 8/1993 | Morita |
| 5,394,331 | A | 2/1995 | Dudek et al. |
| 5,598,335 | A | 1/1997 | You |
| 6,038,505 | A | 3/2000 | Probst et al. |
| 6,154,658 | A | 11/2000 | Caci |
| 6,356,831 | B1 | 3/2002 | Michelini et al. |
| 6,363,312 | B1 * | 3/2002 | Griffin .................. 701/103 |
| 6,374,173 | B1 | 4/2002 | Ehlbeck |
| 6,925,802 | B2 | 8/2005 | Arnold |
| 7,742,867 | B2 | 6/2010 | Liu et al. |
| 8,322,472 | B2 | 12/2012 | Gonze |
| 2003/0121249 | A1 | 7/2003 | Foster et al. |
| 2003/0160455 | A1 | 8/2003 | Hu et al. |
| 2004/0200271 | A1 | 10/2004 | van Nieuwstadt |
| 2004/0239488 | A1 | 12/2004 | Douglass, Jr. et al. |
| 2005/0005596 | A1 | 1/2005 | Xu et al. |
| 2005/0090940 | A1 | 4/2005 | Pajakowski et al. |
| 2005/0274553 | A1 | 12/2005 | Salman et al. |
| 2006/0086546 | A1 * | 4/2006 | Hu et al. ............. 180/65.2 |
| 2006/0119507 | A1 | 6/2006 | Cawse |
| 2006/0150628 | A1 | 7/2006 | Bolton et al. |
| 2006/0168945 | A1 | 8/2006 | Samad et al. |
| 2006/0185626 | A1 | 8/2006 | Allen et al. |
| 2007/0079605 | A1 | 4/2007 | Hu et al. |
| 2007/0082783 | A1 | 4/2007 | Hu et al. |
| 2007/0106442 | A1 | 5/2007 | Lu |
| 2007/0112475 | A1 | 5/2007 | Koebler et al. |
| 2007/0199320 | A1 | 8/2007 | Yager et al. |
| 2007/0246272 | A1 | 10/2007 | Ogata |
| 2008/0027639 | A1 | 1/2008 | Tryon |
| 2008/0059036 | A1 | 3/2008 | Imai et al. |
| 2008/0078167 | A1 | 4/2008 | Wang et al. |
| 2008/0083215 | A1 | 4/2008 | Yan |
| 2008/0163610 | A1 | 7/2008 | Baird et al. |
| 2008/0163855 | A1 * | 7/2008 | Matthews et al. ........ 123/568.12 |
| 2008/0208393 | A1 | 8/2008 | Schricker |
| 2008/0249667 | A1 | 10/2008 | Horvitz et al. |
| 2008/0254937 | A1 | 10/2008 | Makiyama |
| 2008/0262712 | A1 | 10/2008 | Duty et al. |
| 2008/0306674 | A1 | 12/2008 | Hill et al. |
| 2009/0082957 | A1 | 3/2009 | Agassi et al. |
| 2009/0118090 | A1 | 5/2009 | Heap et al. |
| 2009/0118091 | A1 | 5/2009 | Lahti et al. |
| 2009/0222190 | A1 * | 9/2009 | Andreae et al. ............ 701/102 |
| 2009/0272099 | A1 * | 11/2009 | Garimella et al. ............ 60/277 |
| 2009/0276267 | A1 | 11/2009 | Padan |
| 2009/0293453 | A1 * | 12/2009 | Sujan ..................... 60/285 |
| 2010/0010732 | A1 | 1/2010 | Hartman |
| 2010/0023190 | A1 | 1/2010 | Kumar et al. |
| 2010/0228404 | A1 | 9/2010 | Link, II et al. |
| 2010/0287073 | A1 | 11/2010 | Kocis et al. |
| 2010/0318273 | A1 | 12/2010 | Aleksic et al. |
| 2011/0146270 | A1 | 6/2011 | Guo et al. |
| 2012/0167554 | A1 | 7/2012 | Zhang et al. |
| 2013/0047607 | A1 | 2/2013 | Petrovic et al. |

* cited by examiner

SUPERVISORY THERMAL MANAGEMENT SYSTEM AND METHOD FOR ENGINE SYSTEM WARM UP AND REGENERATION

CROSS REFERENCE TO RELATED APPLICATIONS

This application is a Continuation of U.S. patent application Ser. No. 13/345,642, filed Jan. 6, 2012, and entitled SUPERVISORY THERMAL MANAGEMENT SYSTEM AND METHOD FOR ENGINE SYSTEM WARM UP AND REGENERATION, which claims the benefit of priority to U.S. Provisional Patent Application Ser. No. 61/430,430 filed on Jan. 6, 2011, U.S. Provisional Application No. 61/431,290, filed on Jan. 10, 2011, and U.S. Provisional Application No. 61/431,291, filed on Jan. 10, 2011. The entire contents of each of these applications being hereby incorporated by reference.

FIELD OF THE INVENTION

The invention relates to thermal management for an internal combustion engine for increased or optimal fuel efficiency, and more particularly, to a system and method for advising and instructing an operator of an engine system to increase or optimize fuel economy.

BACKGROUND

Design of internal combustion engine systems involves developing thermal management systems for controlling various subsystems of an internal combustion engine system. One parameter of concern is vehicle fuel economy, which can be influenced b the temperature of engine system components. These components can include the engine, transmission and other powertrain components, and exhaust aftertreatment systems components, which generally operate more efficiently after achieving a sufficient operating temperature after a warm up period.

Generally, efficiency peaks when the system component temperatures reach a particular point. A system that is either too cold or too warm will demonstrate degraded efficiency as compared to a system in the neighborhood of the temperature "sweet spot." Traditionally, engine systems and other powertrain components are isolated in the treatment of powertrain warm up. Engine calibrations often provide for "cold calibration" functioning that is primarily targeted at preventing misfire and maintaining emissions control rather than addressing fuel economy.

In aftertreatment systems, two stages of thermal management that often cost the system from the standpoint of fuel consumption are selective catalytic reduction (SCR) warm-up and diesel particulate filter (DPF) regeneration. These two stages of aftertreatment system component thermal management also aid to warm-up a diesel oxidation catalyst (DOC) to light-off temperature. At light-off temperature the diesel fuel present in the DOC will ignite, yielding an exothermic reaction with a consequent increase in exhaust gas temperature.

Currently, engine systems and other powertrain components are isolated in the treatment of aftertreatment system thermal management. Engine calibrations often provide for "regeneration calibration" and "warm-up calibration" for the aftertreatment system. For example, a "DOC warm-up calibration" can include injecting late post fuel that combusts in-cylinder sufficiently late in the piston cycle to primarily produce heat and little or no torque.

SUMMARY

This disclosure provides system and method for thermally managing an internal combustion engine system to increased or optimal fuel efficiency during engine system warm up or regeneration periods. The system and method determine whether a temporary inefficient operation of the engine can result in increased optimized fuel economy. The system and method generates a recommendation to operate the engine system inefficiently, such as by down shifting to a lower transmission gear to increase engine speed, if it is determined the inefficient operation would result in better fuel economy.

In one aspect, a method determines a transmission gear shift recommendation based on optimization of overall fuel economy. The method includes receiving data indicative of at least one current vehicle operating condition, where the operating condition data includes data representing or signifying at least one of transmission out power and speed, current gear number, transmission gearing set, current engine temperature, current engine speed, current engine torque, and fueling. Data are received from engine fueling maps based on cold and warm-up conditions, an expected temperature change is determined based on a transmission down shift and higher engine speed in view of the operating condition data and the fueling maps, and an expected temperature change is determined based on a transmission up shift and lower engine speed in view of the operating condition data and the fueling maps. A transmission gear shift recommendation is determined in view of the determined expected temperature changes based on optimization of overall fuel economy.

In another aspect of the disclosure, a system is adapted to determine a transmission gear shift recommendation based on optimization of overall fuel economy, and includes a vehicle operating condition module including data indicative of at least one current vehicle operating condition, where the operating condition data includes data representing or signifying at least one of transmission out power and speed, current gear number, transmission gearing set, current engine temperature, current engine speed, current engine torque, and fueling. The system includes an engine fueling map module having data from engine fueling maps based on cold and warm-up conditions, and an expected temperature change module including data based on a transmission down shift and higher engine speed in view of the operating condition data and the fueling maps, and including data based on transmission up shift and lower engine speed in view of the operating condition data and the fueling maps. An optimization module contains a transmission gear shift recommendation in view of the determined expected temperature changes based on optimization of overall fuel economy.

In yet another aspect of the disclosure, a method of managing vehicle engine/transmission systems assists in thermal management of an engine exhaust aftertreatment system. The method includes receiving data indicative of at least one current vehicle operating condition, where the operating condition data includes data signifying at least one of transmission out power and speed, current gear number, transmission gearing set, current engine temperature, current engine speed, current engine torque, and fueling. Data are received from engine fueling maps based on warm-up conditions, a target temperature is received. A first expected exhaust temperature is determined based on a transmission down shift and higher engine speed in view of the operating condition data and the fueling maps, a second expected exhaust temperature is determined based on a transmission down shift and higher engine speed coupled with fuel dosing, and a third expected exhaust temperature is determined based on fuel dosing and non-shifted transmission. The first, second and third expected exhaust temperatures are compared against the target temperature, and a transmission gear shift recommendation is provided in view of the compared expected exhaust temperatures based on an optimization of overall fuel economy.

In still another aspect of the disclosure, a system is adapted to manage vehicle engine/transmission systems to assist in thermal management of an engine exhaust aftertreatment system. The system includes a vehicle operating condition module including data indicative of at least one current vehicle operating condition, where the operating condition data includes data signifying at least one of transmission out power and speed, current gear number, transmission gearing set, current engine temperature, current engine speed, current engine torque, and fueling. An engine fueling map module includes data from engine fueling maps based on warm-up conditions, and a target temperature module includes a target temperature. An expected exhaust temperature module contains a first expected exhaust temperature based on a transmission down shift and higher engine speed in view of the operating condition data and the fueling maps, a second expected exhaust temperature based on a transmission down shift and higher engine speed coupled with fuel dosing, and a third expected exhaust temperature based on fuel dosing and non-shifted transmission. A comparison module contains a comparison of the first, second and third expected exhaust temperatures relative to the target temperature. An optimization module contains a transmission gear shift recommendation in view of the comparison of the expected exhaust temperatures, where the recommendation is based on an optimization of overall fuel economy.

A method of managing vehicle engine/transmission systems assists in thermal management of an engine aftertreatment DOC warm-up system. The method includes receiving data indicative of at least one current vehicle operating condition, where the operating condition data includes data signifying at least one of transmission out power and speed, current gear number, transmission gearing set, current engine temperature, current engine speed, current engine torque, and fueling. The method further includes receiving data from engine fueling maps based on warm-up conditions, and receiving a target temperature related to DOC light-off. A first expected exhaust temperature is determined based on a transmission down shift and higher engine speed in view of the operating condition data and the fueling maps, a second expected exhaust temperature is determined based on a transmission down shift and higher engine speed coupled with late post fuel injection, and a third expected exhaust temperature is determined based on late post fuel injection and non-shifted transmission. The first, second and third expected exhaust temperatures are compared against the target temperature, a transmission gear shift recommendation is provided in view of the compared expected exhaust temperatures based on an optimization of overall fuel economy.

A system adapted to manage vehicle engine/transmission systems assists in thermal management of an engine aftertreatment DOC warm-up system. The system includes a vehicle operating condition module including data indicative of at least one current vehicle operating condition, where the operating condition data includes data signifying at least one of transmission out power and speed, current gear number, transmission gearing set, current engine temperature, current engine speed, current engine torque, and fueling. The system further includes an engine fueling map module including data from engine fueling maps based on warm-up conditions, and a target temperature module including a target temperature related to DOC light-off. An expected exhaust temperature module contains a first expected exhaust temperature based on a transmission down shift and higher engine speed in view of the operating condition data and the fueling maps, a second expected exhaust temperature based on a transmission down shift and higher engine speed coupled with late post fuel injection, and a third expected exhaust temperature based on late post fuel injection and non-shifted transmission. A comparison module contains a comparison of the first, second and third expected exhaust temperatures relative to the target temperature. An optimization module contains a transmission gear shift recommendation in view of the comparison of the expected exhaust temperatures, where the recommendation is based on an optimization of overall fuel economy.

DETAILED DESCRIPTION

Figure 1:
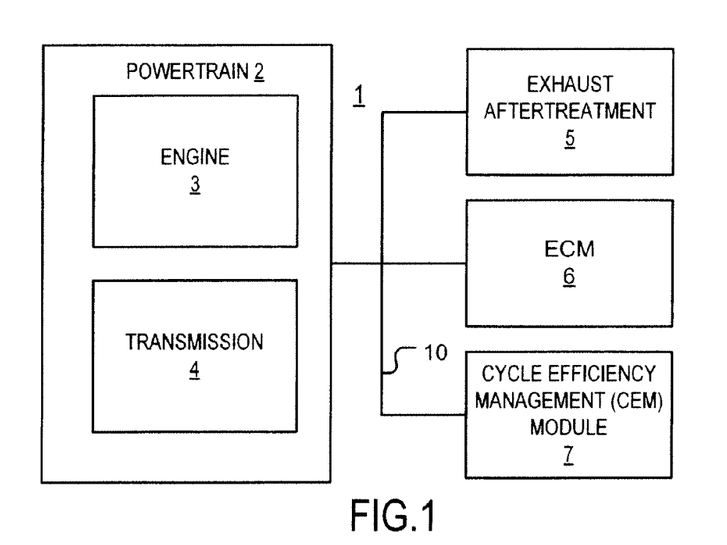
FIG. 1 is a diagram of an internal combustion engine control system including a cycle efficiency management (CEM) module according to an exemplary embodiment.

FIG. 1 shows a diagram of an engine system 1 according to an embodiment. Engine system 1 can be integrated into a vehicle (not shown), such as a truck or an automobile. The engine system 1 includes a powertrain system 2 including an internal combustion engine 3 and transmission 4, an exhaust gas aftertreatment system 5, an electronic control module ECM) 6, and a cycle efficiency management (CEM) module 7 that employs control processes to furnish an operator of the vehicle with anticipated and currently desired vehicle operational behavior to optimize fuel economy. The components of engine system 1 communicate with the ECM or one another via a network 10, which can be, for example, a controller area network (CAN).

The control processes of the CEM focus on powertrain and aftertreatment system components, such as the engine 3, transmission 4, accessories, final drive, wheels, vehicle, a particulate filter (e.g., a DPF), a DOC and an SCR catalyst. The processes interface with the operator to provide guidance as to appropriate vehicle speed/power targets and transmission gear selection targets. The CEM module 7 can be useful in conditioning an operator to optimize behavior, and thus fuel economy based on certain performance criteria. In other words, the CEM module 7 can perform a supervisory role in connection with vehicle operation and instruct the vehicle operator with recommendations via an operator interface.

While not shown in FIG. 1, the powertrain also can include an energy conversion device, such as a turbocharger (e.g., a variable geometry turbocharger (VGT)), a high pressure fuel system including fuel injectors for injecting fuel into cylinders of the engine 3, and at least one dosing injector or injector function for injecting fuel into the exhaust gas upstream from aftertreatment system components. The powertrain 2 of FIG. 1 operates in accordance with a requested or set engine speed command $Speed_{cmd}$ and fuel rate command $Fuel_{cmd}$. These commands are provided to a set of static lookup tables in the ECM 6 to determine a pre-calibrated reference value for each of engine out $O_2$, engine out λ, engine out NOx, and intake $O_2$ corresponding to a current operating point or mode defined by the $Speed_{cmd}$ and $Fuel_{cmd}$ commands while maintaining compliance with emissions requirements. The ECM provides signals corresponding to the lookup table output to the to the engine system components, such as the air handling system components, EGR valve, fuel system components to control the engine speed and fueling. The term "pre-calibrated" is used herein to describe a predetermined value derived by experiment and/or calculation and represents a baseline value corresponding to a requested engine speed and fueling requirement. A pre-calibrated value is sometimes referred to herein as a "normal" or "nominal" value that is predetermined and stored in memory and accessible by the engine system ECM (or other engine system controller).

One aspect of the CEM module 7 is to perform thermal management of the engine system 1 during warm up or regeneration periods by optimizing operating temperatures during these periods by managing the temperature of key powertrain components. The CEM module performs a supervisory function by determining whether down-shifting, no-shifting or up-shifting the transmission from its current gear will yield a more fuel efficient solution in the long run. By down-shifting the transmission, the engine operates at a higher speed while producing the same amount of driveshaft power. The higher engine speed in the down-shifted mode may place the engine at an operating point of lower efficiency. This lower efficiency will cause more fuel to be used in producing the same amount of power. This excess fuel energy will go toward generating heat that will cause an increase in the system temperature. In contrast, the same concept can be used to create an up-shift event to potentially place the engine at a more efficient operating condition, thereby reducing the amount of fuel energy used in generating heat. Thus, by shifting the transmission up or down, the system operating temperature of the engine system 1 can be controlled.

Figure 2:
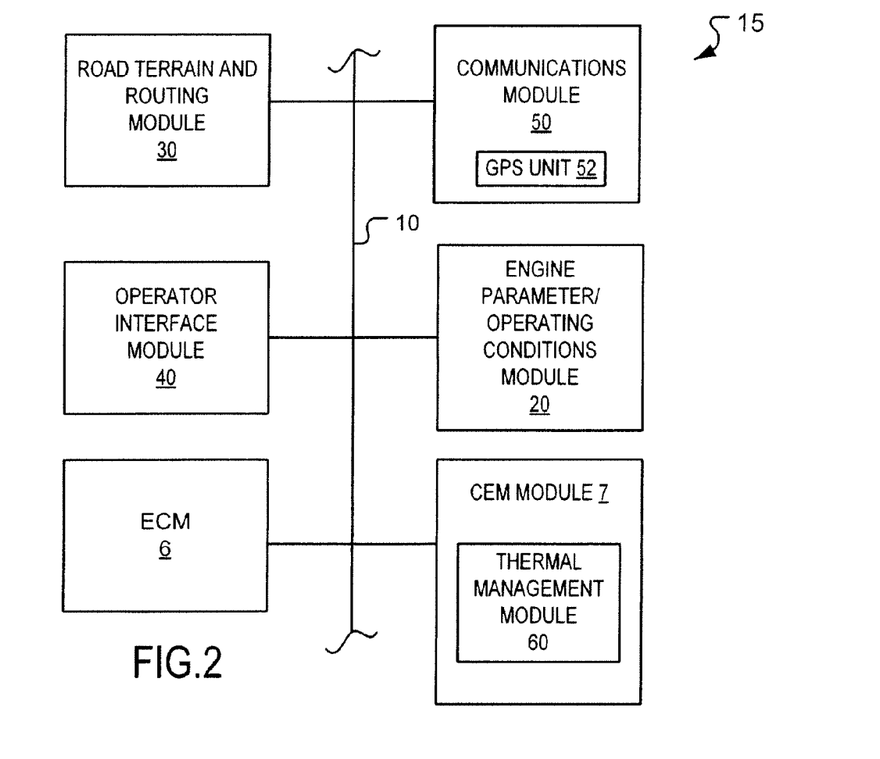
FIG. 2 is a diagram of a network system layout including the CEM module shown in FIG. 1.

FIG. 2 shows a diagram a network system 15 of the monitoring and control system according to an embodiment. The network system 15 includes the ECM 6 and CEM module 7 shown in FIG. 1, and additional modules that communicate with the ECM 6 and/or CEM module 7 via network 10 (e.g., a CAN). Generally, these additional modules can include an engine parameter/operating conditions module 20 that receives predetermined vehicle parameters and current vehicle operating conditions, a road terrain and routing module 30 that receives and/or stores terrain profile data/information and routing information (destination/multidestination routing), and an operator interface module that receives operator input and provides output to the operator can communicate with the CEM module 7 via communications module 50 (e.g., a CAN network module) to provide information to the thermal management module 60 of the CEM module 7. The communications module can include a GPS unit 52 to receive information to determine coordinate positioning and/or supply data in advance of an operation or forthcoming positions or in real-time as the vehicle is operated and route traversed. Alternate embodiments provide for road terrain data to be maintained in computer storage and downloaded to the CEM module prior to the start of a trip or transmitted wirelessly over-the-air at any time, for example, by using cellular technology. The positioning information provided by the GPS unit 52 can be used by the operator interface module 40 to determine and where the vehicle is on a route, the current road conditions, and to predict future road conditions and related engine speed and fueling requirements.

The CEM module 6 can receive information from the ECM 5, the engine parameter/operating conditions module 20, the road terrain module 30, and/or the operator interface module 40 via the communications module 50, and then this information can be used by the thermal management module 60 to determine whether to recommended changing to or maintaining a low efficiency operation, for example, by recommending to the operator via the operator interface module to increase the engine speed via a down shift operation. Additionally, the thermal management module can calculate the cost economy benefit realizable by the recommended operation and output this information to the operator interface module 40 for display to the operator or communication this information to a remote site. It is to be appreciated that other forms of the cost benefit information can be provided by the thermal management module, such as cost benefit accumulated over a period of time, histories of operator input and/or adherence to recommendations to the operator interface module 40, the communications module 50. This information can be stored in local memory of the ECM 6, the CEM module 7, or another one of the modules (not shown), in tangible memory separate from the modules or distributed in memory across plural modules (not shown), or in memory remote from the after being transmitted via communication module 40 or downloaded via another process. This information can be readily accessible by the operator via manipulating an interface such as a menu driven touch screen or other output device.

Figure 3:
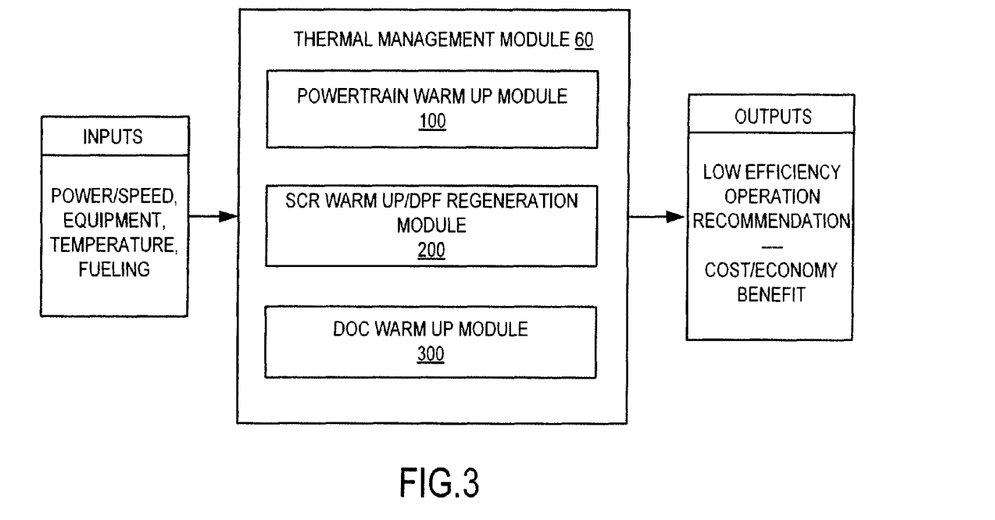
FIG. 3. is a diagram showing details of an exemplary thermal management module of the CEM module shown in FIG. 2.

FIG. 3 is a diagram showing more details of an exemplary thermal management module 60. As shown in FIG. 3, the thermal management module includes the powertrain module 100, an SCR warm up/DPF regeneration module 200, and a DOC warm up module 300. The thermal management module 60 is provided with inputs that include information relating to current power and speed of the powertrain components, information relating to the powertrain equipment available and currently used, the current temperature of at least one powertrain component, and prescribed fueling data. The submodules of the thermal management module 60 use subsets of the inputs information to determine whether temporary inefficient operation of the engine system would be more economical during a warm up or regeneration period. If so, a low efficiency operation recommendation is generated and provided as an output from the thermal management module 60. For example, the recommendation can be provided as a visual indicator on a display, such as a touch screen display, that is visible to the vehicle operator, and/or audibly indicted over a speaker or earphones in the vehicle cockpit. Optionally, some embodiments can provide a cost/economy benefit as output with the corresponding recommended operation, which can be useful to the operator when deciding whether to carry out the recommendation.

An exemplary powertrain, or engine and transmission warm up module 100 determines whether down-shifting or up-shifting the transmission from its current gear will yield a more fuel efficient solution in the long run. By down-shifting the transmission, the engine operates at a higher speed while producing the same amount of driveshaft power. The higher speed may place the engine at an operating point of lower efficiency. This lower efficiency will cause more fuel to be used in producing the same amount of power. The excess fuel energy will go toward generating heat that will cause an increase in the system temperature. In contrast, the same concept can be used to create an up-shift event to potentially place the engine at a more efficient operating condition, thereby reducing the amount of fuel energy used in generating heat. Thus, by shifting the transmission up or down, the system operating temperature can be controlled.

In a process of determining whether to recommend low efficiency engine operation to the vehicle operator according to an exemplary embodiment, the following assumptions are made: instantaneous powertrain conditions can be obtained and a constant power output $P_t$ of the powertrain is maintained; the angular velocity $\omega_{engine}$ of the engine 3 can be determined from a known function of the current transmission gear number and the angular velocity of the transmission output, i.e., $\omega_{engine}$=F(GEAR#, $\omega_{trans\ out}$); and the torque of the engine $\tau_{engine}$ can be determined form the relation: $\tau_{engine}$=P√$\omega_{engine}$. Engine fueling is determined by interpolating between fueling data $FUEL_{cold}$ ($\omega$, $\tau$) and fueling data $FUEL_{warm}$ ($\omega$, $\tau$) from engine fueling maps at "cold" and "warmed up" conditions, respectively, as a function of engine component temperature (e.g., oil or coolant temperature). Next, an expected change in temperature (coolant, oil) per unit time is determined as a function of current $\omega_{engine}$, $\tau_{engine}$ and a first fueling value, and as a function higher engine speed, lower torque, and a second fueling value.

To determine whether operating the powertrain in a the lower efficiency mode is cost effective, an exemplary embodiment considers the rate of change of power/speed demand to predict a next time step power/speed demand, $P_{t+\Delta t}$/$\omega_{trans\ out\ t+\Delta t}$. Given this next time value, the warmer powertrain fuel consumption (while up-shifted) and the cooler powertrain fuel consumption (also up-shifted) are determined. If the difference in the fuel consumption at t+$\Delta$t is greater than the fuel consumption to get the increased temperature, then the downsizing is worth the cost and the thermal management module 60 generates a low efficiency engine operation recommendation, such as a down shift operation. Optionally a benefit estimate such as a cost or economy benefit estimate resulting from the recommended operation, can also be generated and output by the thermal management module 60.

Figure 4:
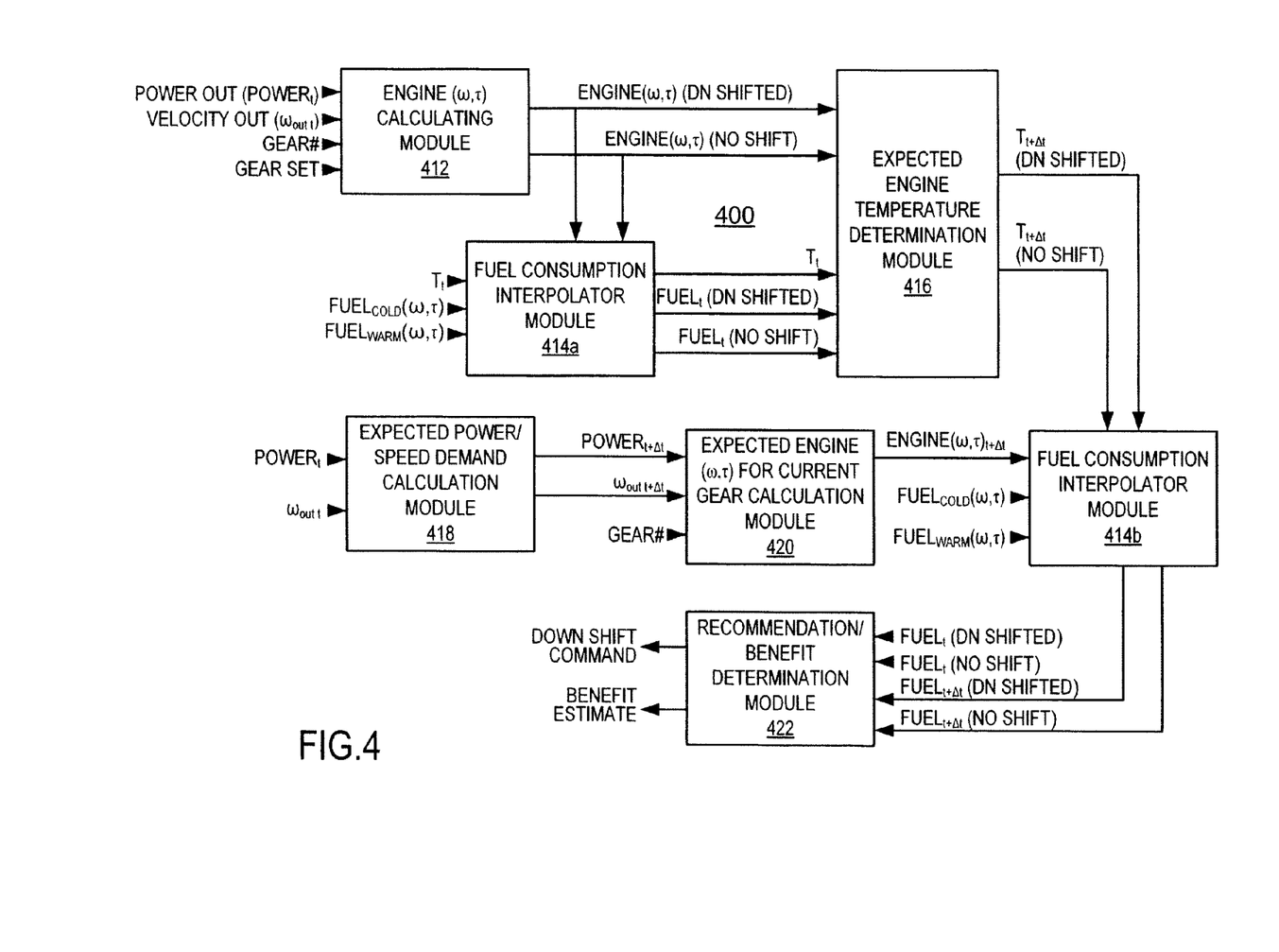
FIG. 4 is a diagram of an exemplary powertrain warm up module of the thermal management module shown in FIG. 3.

FIG. 4 is a signal flow diagram illustrating more details of powertrain warm up module 100 to thermally manage the powertrain 2 in accordance with an exemplary embodiment. As shown in FIG. 4, data indicative of at least one current vehicle operating condition is received as an input to an ENGINE ($\omega$, $\tau$) calculating module 412. The operating condition data includes data signifying or representing current transmission out power, $POWER_t$, current transmission speed or velocity out, $\omega_{out}$, current gear number, GEAR#, and data indicating the transmission gearing set. The ENGINE ($\omega$, $\tau$) calculating module 412 determines the engine speed to and engine torque $\tau$ at the current gear (GEAR as ENGINE ($\omega$, $\tau$) (NO SHIFT), and at a down shifted gear as ENGINE ($\omega$, $\tau$) (DN SHIFTED).

The calculated values for ENGINE ($\omega$, $\tau$) (NO SHIFT) and ENGINE ($\omega$, $\tau$) (DN SHIFTED) are provided along with data indicating or representing a current temperature, $T_t$, of a powertrain component, such as oil or coolant temperature, and the $FUEL_{cold}$ ($\omega$, $\tau$) and $FUEL_{warm}$ ($\omega$, $\tau$) data, to a table-based fuel consumption interpolator module 414a, which determines fueling, $FUEL_t$ (NO SHIFT), required at the current operating temperature $T_t$ based on speed and torque for the no shift operating condition, and fueling, $FUEL_t$ (DN SHIFTED), required at the current operating temperature $T_t$ for the down shifted operating condition. The fueling maps can be obtained from, for example, memory of the ECM 6 or from storage elsewhere in the system network 15 or from remote storage. The fueling data based on cold and warm conditions can originate from an engine fueling map module (not shown), which is part of the ECM or separate from, but communicably coupled with the ECM and other modules of the engine system 1. Further, such a fueling map module can be provided as part of the fuel consumption module 414a.

The current operating temperature $T_t$, the calculated values for ENGINE ($\omega$, $\tau$) (NO SHIFT), ENGINE ($\omega$, $\tau$) (DN SHIFTED), $FUEL_t$ (NO SHIFT), and $FUEL_t$ (DN SHIFTED) are provided to the expected engine temperature determination module 416, which determines an expected engine (e.g., coolant or oil) temperature at a later time increment $\Delta$t for both the shifted and non-shifted conditions in view of the operating condition data including the current engine speed, torque and fueling, and for the down shifted higher engine speed, torque and fueling. The expected engine temperature determination module 416 provides output $T_{(t+\Delta t)}$ (NO SHIFT) value as the expected powertrain temperature at time t+$\Delta$t for the non-shift (i.e. GEAR#) condition and the output $T_{(t+\Delta t)}$ (DN SHIFTED) value as the expected powertrain temperature at time t+$\Delta$t for the down shifted condition.

The calculated expected temperature values are provided to a fuel consumption interpolator module 414b, which can be provided with or separate from the fuel consumption interpolated module 414a, that determines the fueling, $FUEL_{t+\Delta t}$ (NO SHIFT), at time t+$\Delta$t for the non-shift (i.e. GEAR#) condition and the fueling, $FUEL_{(t+\Delta t)}$ (DN SHIFTED), at time t+$\Delta$t for the down shifted condition based on the temperature value $T_{(t+\Delta t)}$ (NO SHIFT), the temperature value $T_{(t+\Delta t)}$ (DN SHIFTED), the $FUEL_{cold}$ ($\omega$, $\tau$) and $FUEL_{warm}$ ($\omega$, $\tau$) data and an expected ENGINE ($\omega$, $\tau$)$_{t+\Delta t}$. The expected ENGINE ($\omega$, $\Delta$)$_{t+\Delta t}$ is determined by an expected power/speed demand calculation module 418, which utilizes the current condition data $POWER_t$ and the angular velocity out $\omega_{out\ t}$ to determine an expected power, $POWER_{t+\Delta t}$, and speed, $\omega_{t+\Delta t}$ at a later time t+$\Delta$t, for example, based on a rate change of power/speed demand. From these calculated values and the current gear, GEAR#, the expected ENGINE ($\omega$, $\tau$)$_{t+\Delta t}$ is determined.

A recommendation/benefit determination module 422 is an optimization module that receives the fueling $FUEL_{t+\Delta t}$ (NO SHIFT) and $FUEL_{(t+\Delta t)}$ (DN SHIFTED) values along with the $FUEL_t$ (NO SHIFT), and $FUEL_t$ (DN SHIFTED) values, and a comparison is made between the warmer powertrain fuel consumption while up-shifted and the cooler powertrain fuel consumption, also while up shifted. Outputs of the recommendation/benefit determination module 422 include a transmission gear shift recommendation in view of the determined expected temperature changes based on optimization of overall fuel economy, and optionally, a benefit estimate.

Exemplary embodiments provide for the gear shift recommendation to be a down shift command. For example, in an exemplary embodiment, the recommendation/benefit determination module 422 will generate a down shift command or suggestion only if [$FUEL_t$ (DN SHIFTED)–$FUEL_t$ (NO SHIFT)]<[$FUEL_{t+\Delta t}$ (NO SHIFT)–[$FUEL_{t+\Delta t}$ (DN SHIFTED)] and is within system constraints.

The powertrain warm up module 100 can also consider information from a global positioning system (GPS) communicating with the thermal management module 60. For example, the GPS unit 52 and road terrain and routing module 30 and other modules in the system network 15 can provide information on route dynamics to effect thermal management of the powertrain in accordance with an exemplary embodiment. For instance, an exemplary embodiment of a system or method can provide for the use of the GPS to predict when the engine will experience higher/lower load conditions based on the terrain of the route being traveled. This capability can facilitate providing more information for look-ahead decisions as to whether to generate a recommendation for lower efficient operation. For example, the GPS can allow for taking advantage of opportunities where a heat generating load on the powertrain would naturally occur in the course of the route. For example, if the GPS indicates that an elevated load condition is forthcoming, such as an increasing grade, then the control system recognizes that the anticipated higher engine speed will result in a passive increase in powertrain temperature and forgo recommending down shift. Conversely, on long decreasing grades, it may not be necessary to operate in an inefficient mode during warm up if duration of the lighter load is known to long enough to allow for warming up the powertrain in a cost effective manner.

Figure 6:
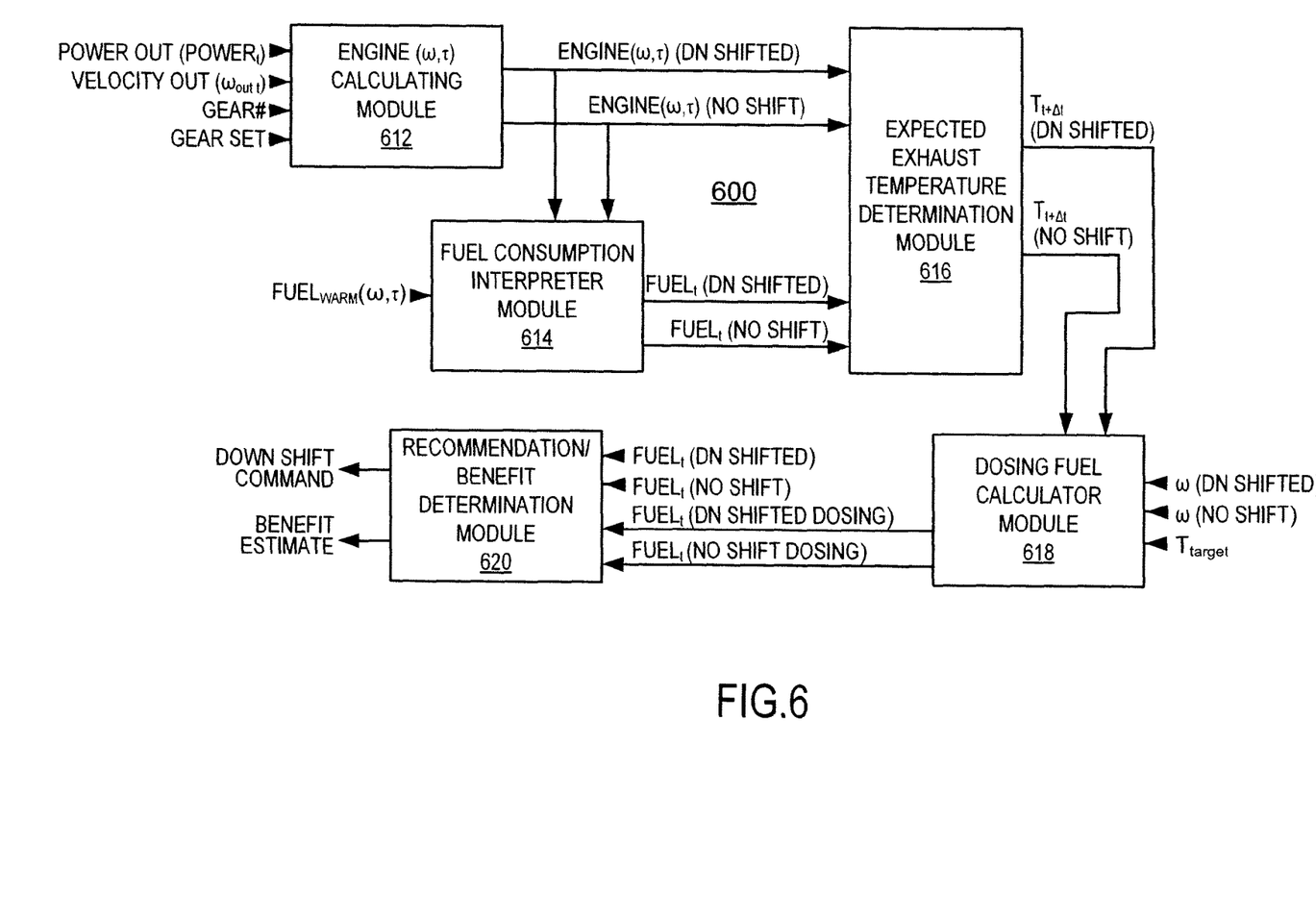
FIG. 6 is a diagram of an exemplary SCR warm up/DPF regeneration module of the thermal management module of FIG. 3.

An exemplary SCR warm up/DPF regeneration module 200 determines whether down-shifting the transmission from its current gear, either alone or in combination with fuel dosing, will yield a more fuel efficient solution in the long run. As explained above with respect to the powertrain warm up module, by down-shifting the transmission, the engine operates at a higher speed while producing the same amount of driveshaft power. The higher speed may place the engine at a lower efficiency operating point. This lower efficiency will require more fuel to be used to produce the same amount of power. The excess fuel energy will go toward generating heat that will drive up the exhaust temperature. This higher exhaust temperature can be modeled along with a fuel dosing strategy to determine an optimal solution that minimizes the overall amount of fuel consumed in achieving a target external device temperature. Estimating the increased exhaust temperature can be accomplished by any method known to those of ordinary skill in the art, such as one of several physics and regression based concepts existing in the literature to estimate exhaust temperature, which can also be applied to determine the resulting increase in exhaust temperature. If down-shifting generates an insufficient temperature increase, energy based models can be applied to determine the excess amount of dosing fuel that is needed to achieve the remaining increase to the target temperature. For example, the exhaust gas temperature can be modeled by using the engine fueling map and the Diesel Oxidation Catalyst (DOC) outlet gas temperature can be modeled as a function of dosing fuel quantity. It is assumed through these steps that the DOC is at light-off temperature to ignite the dosing fuel.

To determine DOC inlet conditions, turbine temperature loss and pipe loss are evaluated. Determining the turbine and pipe losses can be carried out using calculations based on the system physics or by using empirical models in combination with physical and/or virtual sensor signals and data tables and/or maps.

For example, an embodiment can include physical exhaust pressure sensors and turbine speed sensors, virtual exhaust temperature and exhaust mass flow sensors, and a turbine performance map (e.g., efficiency and speed). The engine out pressure is measured and the engine out temperature is estimated based on engine ECM model. The turbine out pressure and operating point efficiency can be determined using the turbine performance map. Based on compressor air flow dynamics, given corrected mass air flow and turbocharger speed, the pressure ration and turbine efficiency can be determined uniquely by two functions $F_1$ and $F_2$:

$$\frac{P_{out}}{P_{in}} = F_1\left(\frac{T_{sp}}{\sqrt{T_{in}}}, \frac{\dot{m}\sqrt{T_{in}}}{P_{in}}\right), \text{ and}$$

$$\eta = F_2\left(\frac{T_{sp}}{\sqrt{T_{in}}}, \frac{\dot{m}\sqrt{T_{in}}}{P_{in}}\right),$$

where $T_{in}$ is the exhaust temperature, $T_{out}$ is the turbine out temperature, $P_{in}$ is the exhaust pressure, and $P_{out}$ is the turbine out pressure. In essence, this provides the turbine flow map. The turbine efficiency map combined with isentropic relationship gives turbine out pressure and turbine out temperature. The turbine map uses measured turbine speed, inlet temperature and pressure, and mass flow to determine outlet pressure. The unknowns can be estimated using these non-linear maps, and two knowns, the turbine out temperature can be determined using the isentropic relationship, where outlet pressure, inlet temperature, and inlet pressure is used to determine outlet temperature:

$$T_{out} = \frac{T_{in}}{\eta}\left(\left(\frac{P_{out}}{P_{in}}\right)^{\frac{\gamma-1}{\gamma}} - 1\right) + T_{in}.$$

Pipe temperature loss can be determined by modeling pipe losses $\Delta P$, $\Delta T$ to estimate true DOC inlet conditions. Incompressible flow modeling is applicable (Mach numbers of flow<0.3). In general, $\Delta p$ is a function of gauge pressure $P^{gauge}$, air density $\rho$, mass flow rate $\dot{m}$, flow velocity U, the length of the flow d, and the flow area A:

$$\Delta p = F(P^{gauge}, \rho, U, \dot{m}, d, A), \text{ and}$$

$$\Delta p = K\frac{\rho}{2A^2}q|q| = K\frac{\rho}{2}U^2 = K\frac{\rho}{2}\left(\frac{\dot{m}}{\rho A}\right)^2 = K\frac{\dot{m}^2}{2A^2\rho}.$$

Propose:

$$\Delta p = K_1 P^{gauge} + K_2 \rho U^2 \quad (5)$$

Where K is a constant of proportionality, q is the flow rate, A is the flow area, U is the flow velocity, is the mass flow rate, and d is the length of the flow. $K_1$, $K_2$ are regression fitted coefficients developed in test cell testing. $P^{gauge}$ is gauge pressure of the pressure at the turbine outlet. Air density ($\rho$) is determined from the ideal gas law. Flow velocity (U) is determined from mass flow rate, pipe area and air density. Pressure at DOC inlet is determined from turbine outlet pressure and dP empirical model. Also, using the adiabatic ideal gas law:

$$\frac{P}{P_t} = \left(\frac{T}{T_t}\right)^{\frac{\gamma}{\gamma-1}},$$

where P is the local static pressure, $P_t$ is the stagnation pressure, T is the local static temperature, and $T_t$ is the stagnation temperature. Stagnation pressure/temperature (the total pressure/temperature) is unchanged over fully developed streamlines (assume adiabatic behavior). Static pressure/temperature related to total pressure/temperature (in the absence of gravity) by adding in flow velocity, which is known. Stagnation pressure/temperature is total pressure/temperature when flow comes to rest. Given static P (or pressure at DOC inlet), stagnation P and stagnation T use adiabatic relationship to determine static T (or temperature at DOC inlet). Given no losses and changes to pressure, then under adiabatic conditions the temperature will remain unchanged as well.

SCR catalysts (sometimes referred to herein as "SCR") currently are used in diesel aftertreatment systems. The SCR is typically fluidly connected to a diesel oxidation catalyst (DOC) and positioned downstream of the DOC with a diesel particulate filter (DPF) provided between the SCR and DOC. The SCR requires a reductant dosing system, such as a diesel emissions fluid (DEF) dosing system, which is provided upstream of the SCR to inject a reductant such as anhydrous $NH_3$ aqueous $NH_3$, or most often a precursor that is convertible to $NH_3$ such as urea ammonia or urea, into the exhaust flow. The reductant dosing system can include a doser, a decomposition reactor, and a mixer. The reductant is adsorbed onto a catalyst surface in the SCR where it is used to convert the NOx emissions in the exhaust gas flow to nitrogen and water, and in the case of urea, also into carbon dioxide.

Figure 5:
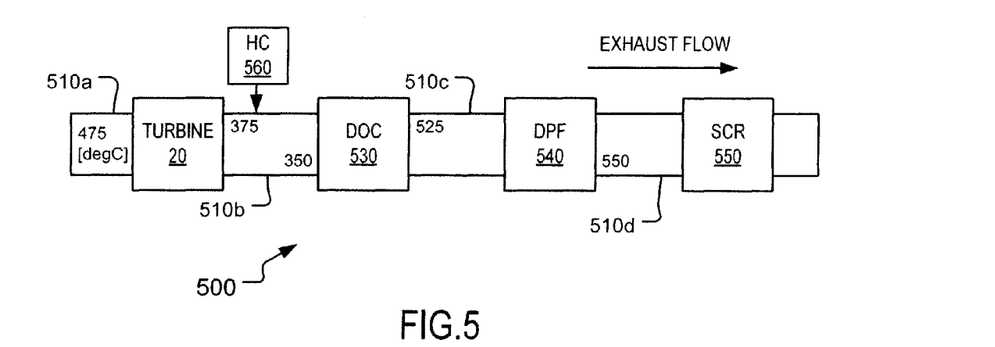
FIG. 5 is a diagram of a turbocharger and aftertreatment system according to an exemplary embodiment.

FIG. 5 shows an exemplary embodiment of an exhaust aftertreatment system 500 attached to an exhaust gas conduit segment 510b downstream of a turbine 520 of a turbocharger. The aftertreatment system 500 includes a DOC 530 in the exhaust gas path downstream of the turbine 520, a DPF 540 in the exhaust gas path downstream of the DOC 530, and an SCR 550 in an exhaust gas path downstream of the DPF 530. A hydrocarbon (HC) doser 560 is provided in the exhaust gas conduit segment 510b between the turbine 520 and the DOC 530 to inject fuel into the exhaust gas flow. An exemplary temperature distribution is also depicted on the segments 510a-510d of the exhaust gas conduit. As can be seen, the exhaust gas temperature drops from 475° C. in the exhaust gas conduit segment 510a at the inlet of turbine 420 to 350° C. in the exhaust gas conduit segment 510b at the inlet of the DOC 530, increases across the DOC 530 from 350° C. to 525° C. at the exhaust gas conduit segment 510c, and then increases to 550° C. in the exhaust gas conduit segment 510d at the outlet of the DPF 540.

To determine the mass flow rate of fuel, an energy balance equation across the DOC 530 is utilized:

$$Energy_{In} + Energy_{Gen} = Energy_{Out} + Energy_{Lost} + Energy_{Stored}.$$

The two right terms on the right of the above equation are negligible, leading to:

$$(\dot{m}_{exh} + \dot{m}_{fuel}) * Cp_{in} * T_{in} + m_{fuel} * LHV_{fuel} = (\dot{m}_{exh} + \dot{m}_{fuel}) * Cp_{trgt} * T_{trgt}$$

and the mass flow of fuel associated with energy is negligible, leading to:

$$\dot{m}_{fuel} = \frac{Nominal\_Gain * \dot{m}_{exh} * (C_p * T_{trgt} - Cp_{in} * T_{in})}{LHV_{fuel} - Cp_{trgt} * T_{trgt}}.$$

In a process of determining whether to recommend low efficiency engine operation to the vehicle operator according to an exemplary embodiment, the following assumptions are made: instantaneous powertrain conditions can be obtained and a constant power output $P_t$ of the powertrain is maintained; the angular velocity $\omega_{engine}$ of the engine 3 can be determined from a known function of the current transmission gear number and the angular velocity of the transmission output, i.e., $\omega_{engine} = F(GEAR\#, \omega_{trans\_out})$; the torque of the engine $\tau_{engine}$ can be determined form the relation: $\tau_{engine} = P_t / \omega_{engine}$; and the DOC 530 is at a light-off temperature. Given the current DPF temperature and the target temperature, the required DOC ΔT can be determined. This can be achieved by in-cylinder or exhaust conduit dosing of fuel that lights off in the DOC 530, running the engine inefficiently, for example, at a high speed, or a combination of fuel dosing and inefficient engine operation. The exhaust conditions can be modeled using the engine fueling map for warm operation, $FUEL_{warm}(\omega, \tau)$, AND the exhaust temperature can be modeled as a function of $(\omega, \tau)$. The outlet gas temperature of the DOC 530 can be modeled as a function of doping fuel quantity.

Given the desired engine out power, the following quantities are determined: X=total fueling due to down shifting and meeting the remaining temperature target with dosing; and Y=total fueling due to meeting the whole temperature target with dosing. The thermal management module 60 generates a low efficiency engine operation recommendation, such as a down shift operation and provided to the operator interface module 40 if it is determined that X is less than Y.

FIG. 6 is a signal flow diagram illustrating more details of an SCR warm up/DPF regeneration module 200 to thermally manage the exhaust aftertreatment system 5 in accordance with an exemplary embodiment. As shown in FIG. 6, data indicative of at least one current vehicle operating condition is received as an input to an ENGINE $(\omega, \tau)$ calculating module 612. The operating condition data includes data signifying or representing current transmission out power, $POWER_t$, current transmission speed or velocity out, $\omega_{out}$, current gear number, GEAR#, and data indicating the transmission gearing set. The ENGINE $(\omega, \tau)$ calculating module 612 determines the engine speed ω and engine torque τ at the current gear (GEAR#) as ENGINE $(\omega, \tau)$ (NO SHIFT), and at a down shifted gear as ENGINE $(\omega, \tau)$ (DN SHIFTED).

The calculated values for Engine $(\omega, \tau)$ (NO SHIFT) and ENGINE $(\omega, \tau)$ (DN SHIFTED) are provided along with data $FUEL_{warm}(\omega, \tau)$ from engine fueling maps at "warmed up" conditions to a table-based fuel consumption interpreter module 614, which determines fueling, $FUEL_t$ (NO SHIFT), required based on speed and torque for the no shift operating condition and fueling, $FUEL_t$ (DN SHIFTED), required for the down shifted operating condition. The fueling maps can be obtained from, for example, memory of the ECM 6 or from storage elsewhere in the system network 15 or from remote storage. The fueling data based on warm conditions can originate from an engine fueling map module (not shown), which is part of the ECM or separate from, but communicably coupled with the ECM and other modules of the engine system 1.

The calculated values for Engine $(\omega, \tau)$ (NO SHIFT), Engine $(\omega, \tau)$ (DN SHIFTED), $FUEL_t$ (NO SHIFT), and $FUEL_t$ (DN SHIFTED) are provided to the expected exhaust temperature determination module 616, which determines an expected exhaust temperature at a later time increment Δt for both the shifted and non-shifted conditions in view of the operating condition data and the fueling maps, for example, utilizing one of several known physics and known regression based concepts existing in the literature. The expected exhaust temperature determination module 616 provides output $T_{(t+\Delta t)}$ (NO SHIFT) value as the expected exhaust temperature at time t+Δt for the non-shift (i.e. GEAR#) condition and the output $T_{(t+\Delta t)}$ (DN SHIFTED) value as the expected exhaust temperature at time t+Δt for the down shifted condition.

The calculated expected temperature values are provided to a dosing fuel calculator module 618 that utilizes an energy-based model. Also provided to the dosing fuel calculator module 618 is a temperature target $T_{target}$, engine speed ω (DN SHIFTED) related to the shifted condition, engine speed ω (NO SHIFT) related to the non-shifted condition to help compute the exhaust flow, as inputs to determine the dosing fuel required to reach the target temperature $T_{target}$. Other inputs can be provided as well to further refine the physics model. The dosing fuel calculator module 618 outputs a value of dosing fuel required for meeting $T_{target}$ in the down shifted operating condition $FUEL_t$ (DN SHIFTED DOSING) and a value of dosing fuel required for meeting $T_{target}$ in the non-shifted operating condition $FUEL_t$ (NO SHIFT DOSING). The target temperature data $T_{target}$ can originate from a target temperature module (not shown), which is part of the ECM or separate from, but communicably coupled with the ECM and other modules of the engine system 1.

The fueling values $FUEL_t$ (DN SHIFTED DOSING) and $FUEL_t$ (NO SHIFT DOSING) are provided along with the fueling values $FUEL_t$(DN SHIFTED) and $FUEL_t$(NO SHIFT) determined by the fuel consumption interpreter module 614 to a recommendation/benefit determination module 620, where a comparison is made between fueling required to reach $T_{target}$ using down-shifting plus, if required, fueling needed in meeting the remaining temperature target with dosing, and/against total fueling due to meeting the temperature target with dosing alone. Exemplary embodiments provide for the dosing to occur in-cylinder and to light-off in the DOC, although dosing can be provided to the exhaust flow downstream of the engine in another embodiment. Outputs of the recommendation/benefit determination module 620 include a transmission gear shift recommendation in view of the determined expected temperature changes based on optimization of overall fuel economy, and a benefit estimate. It is to be appreciated that the functions performed by recommendation/benefit determination module 620 can be carried out by more than one module, or submodules of the recommendation/benefit determination module 620. For example, the comparison between the above required fueling can be performed by a comparison module, and the transmission gear shift recommendation can be contained in a optimization module.

Additionally, the expected exhaust temperature determination module 816 can determine more than two expected temperatures. For example, a first expected exhaust temperature can be determined based on a transmission down shift and higher engine speed in view of the operating condition data and the fueling maps, a second expected exhaust temperature can be determined based on a transmission down shift and higher engine speed coupled with late post fuel injection, and a third expected exhaust temperature can be determined based on late post fuel injection and non-shifted transmission. The recommended benefit determination module 820 can compare the first, second and third expected exhaust temperatures against the target temperature and provide a transmission gear shift recommendation in view of the compared expected exhaust temperatures based on an optimization of overall fuel economy. As above, the functions of comparing and recommendation can be carried out using different comparison and optimization modules.

Exemplary embodiments provide for the gear shift recommendation to be a down shift command. For example, in an exemplary embodiment, the recommendation/benefit determination module 620 will generate a down shift command or suggestion only if $[FUEL_t(DN\ SHIFTED)+FUEL_t(DN\ SHIFTED\ DOSING)]<[FUEL_t(NO\ SHIFT)+FUEL_t\ (NO\ SHIFT\ DOSING)]$ and is within system constraints.

Figure 7:
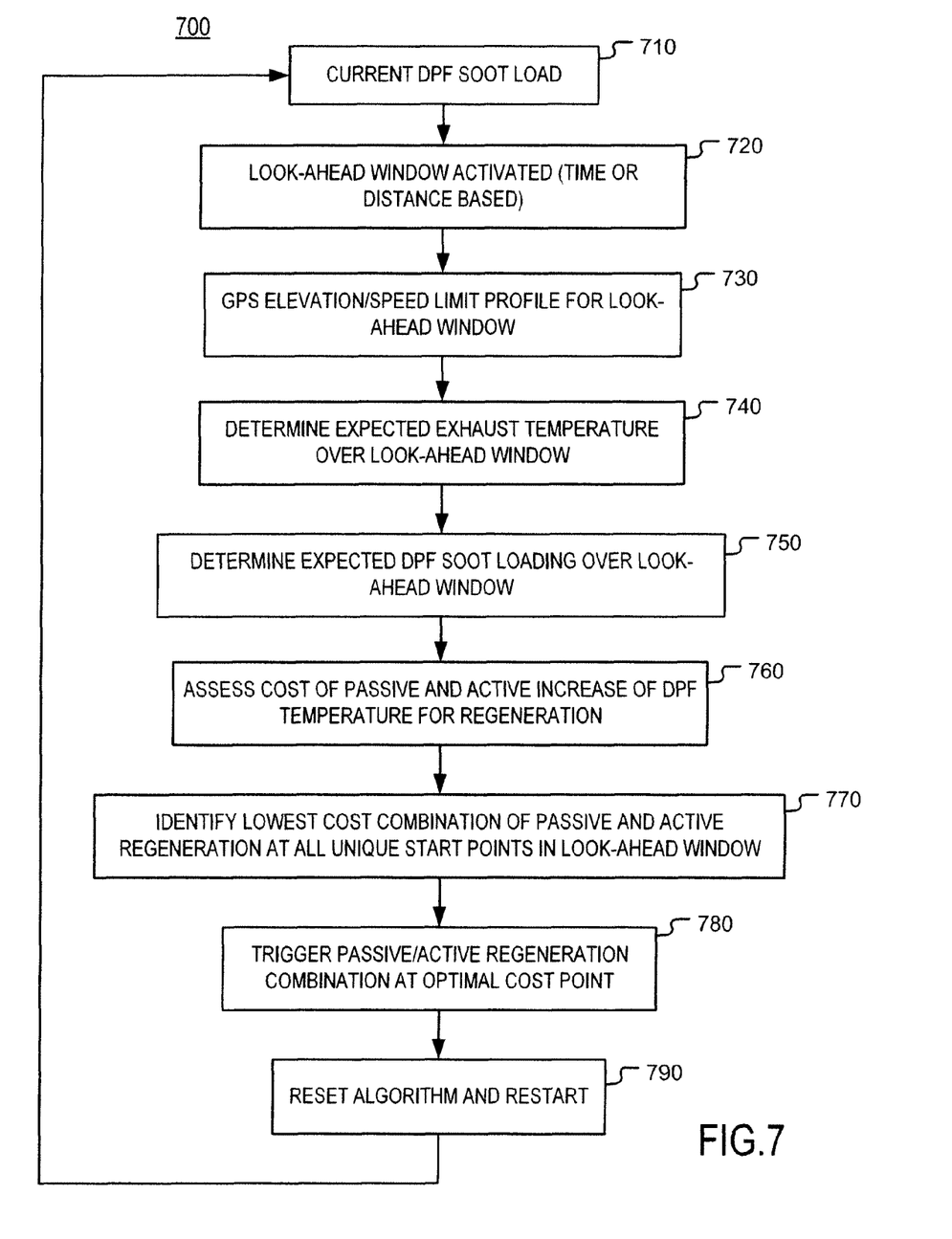
FIG. 7 is a process flow diagram of a DPF regeneration process using GPS according to an exemplary embodiment.

FIG. 7 is a signal flow diagram of an exemplary process 700 illustrating employment of a global positioning system (GPS) of the thermal management module 60, which can include the GPS unit 52 and road terrain and routing module 30 and other modules in the system network 15, to provide information on route dynamics in utilizing the vehicle engine/transmission system to effect aftertreatment system thermal management in accordance with an exemplary embodiment. Exemplary embodiments of the systems and methods provide for the use of the GPS to predict when the engine will experience higher/lower load conditions. This capability will facilitate expedient control of active DPF regeneration by taking advantage of opportunities for passive regeneration or thermal management of the DPF subsystem. For example, if the GPS indicates that an elevated load condition is forthcoming, such as an increasing grade, then the control system recognizes that the anticipated higher engine speed will result in a passive increase in exhaust temperature and can then deliberately inhibit active regeneration. Suppressing active regeneration will result in a savings of fuel consumed.

Use of the GPS to predict higher/lower engine load conditions can also reduce the need for full active regeneration, as typically occurs in urban driving conditions. In the exemplary process 700, a current soot is monitored in process 710. A look-ahead window, which can be based on time or distance, is activated or employed in process 720 to identify anticipated vehicle load changes. For example, in an embodiment, the look-ahead window can be activated after the soot load in the DPF exceeds a given threshold. In process 730, the GPS data, for example, data related to elevation/speed limit, provides a profile for the look-ahead window. In process 740, the exhaust temperature is determined over the look-ahead window based on the profile provided by the GPS data. Assuming optimal transmission matching (or given a transmission shifting map), the vehicle load can be translated into an engine load. Given an exhaust temperature versus engine load map, as well as an exhaust particulate matter (PM) map, an estimate can be made of the expected DPF soot loading over the look-ahead window in process 750. In process 760, the cost of passive and active increase of DPF temperature for regeneration is assessed over the look-ahead window, and process 770 identifies a lowest cost combination of passive and active regeneration at all unique start points in the look-ahead window. Process 780 triggers a passive and active regeneration combination at the lowest or optimal of the identified cost points, and process 790 repeats the above processes for the next look-ahead window.

Also, it is to be appreciated that the thermal management module 60 can determine when the DPF will require regeneration at any time and use the GPS data to determine whether there is a high loading opportunity in the vicinity of the required regeneration event. If such an opportunity is identified, then it can be exploited to supplement regeneration of the DPF, with active regeneration as needed.

Figure 8:
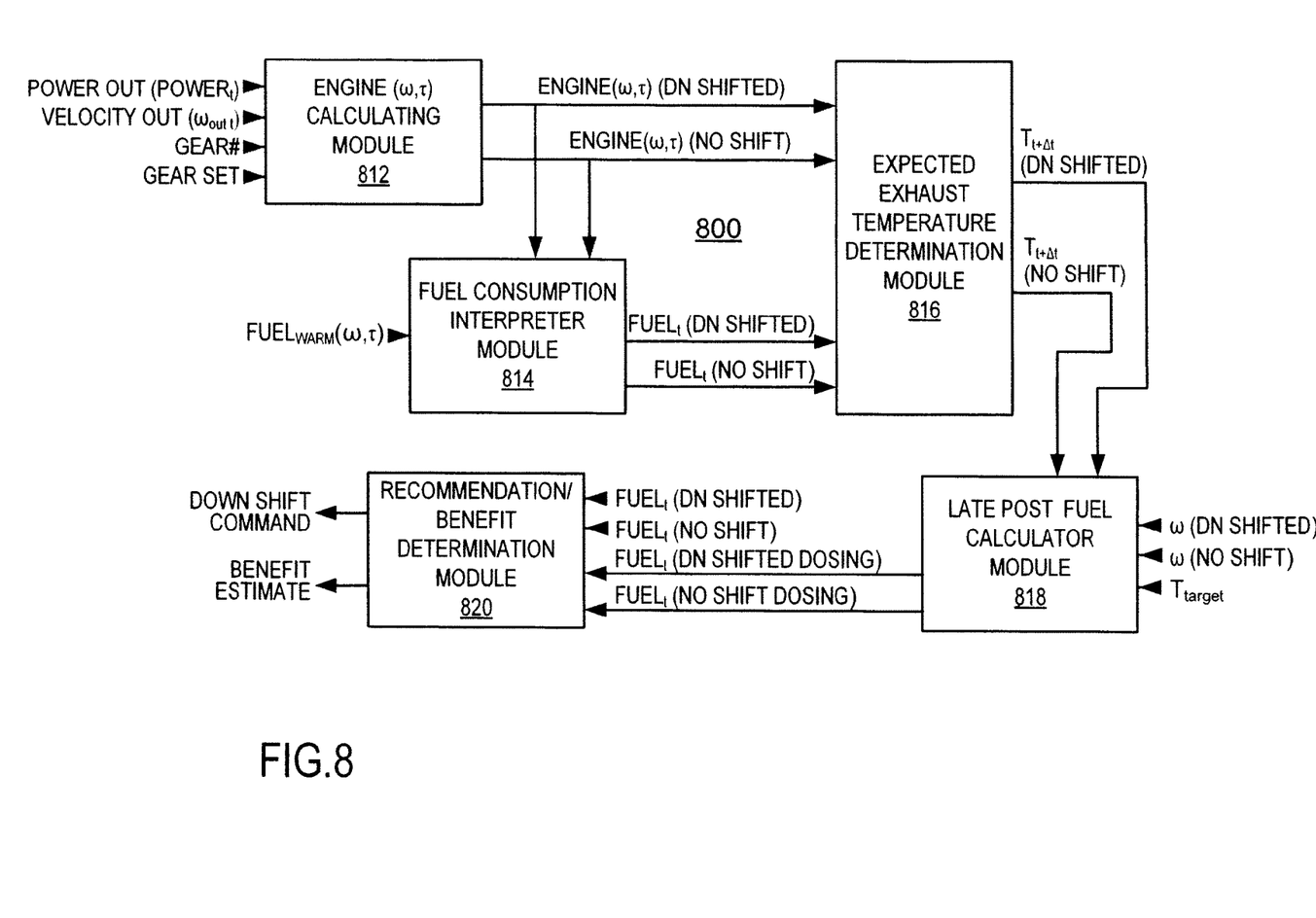
FIG. 8 is a diagram of an exemplary DOC warm up module of the thermal management module shown in FIG. 3.

An exemplary DOC warm up module 300 determines whether down-shifting the transmission from its current gear, either alone or in combination with late post fuel injection, will yield a more fuel efficient solution in the long run. As described above, by down-shifting the transmission, the engine operates at a higher speed while producing the same amount of driveshaft power. The higher speed may place the engine at a lower efficiency operating point, which will require more fuel to be used to produce the same amount of power. The excess fuel energy will go toward generating heat that will drive up the exhaust temperature. This higher exhaust temperature can be modeled along with a late post fueling strategy to determine an optimal solution that minimizes the overall amount of fuel consumed in achieving a target external device temperature. Estimating the increased exhaust temperature can be accomplished by any method known to those of ordinary skill in the art, such as one of several physics and regression based concepts existing in the literature to estimate exhaust temperature, which can also be applied to determine the resulting increase in exhaust temperature. Turbine and pipe loss models can be applied to determine the temperature loss from the engine exhaust to the DOC inlet, and are described above with respect to the SCR warm up/DPF regeneration module 200. If down-shifting generates an insufficient temperature increase, exemplary embodiments provide for energy based models to be applied to determine the excess amount of late post fuel dosing fuel that is needed to achieve the remaining increase to the target temperature. For example, the exhaust gas temperature can be modeled by using the engine fueling map, and the Diesel Oxidation Catalyst (DOC) outlet gas temperature can be modeled as a function of late post injection dosing fuel quantity.

In a process of determining whether to recommend low efficiency engine operation to the vehicle operator according to an exemplary embodiment, the following assumptions are made: instantaneous powertrain conditions can be obtained and a constant power output $P_t$ of the powertrain is maintained; the angular velocity $\omega_{engine}$ of the engine 3 can be determined from a known function of the current transmission gear number and the angular velocity of the transmission output, i.e., $\omega_{engine}=F(GEAR\#, \omega_{trans\ out})$; the torque of the engine $\tau_{engine}$ can be determined form the relation: $\tau_{engine}=P_t/\omega_{engine}$; and the DOC 530 is at a light-off temperature. Given the current DPF temperature and the target temperature, the required DOC $\Delta T$ can be determined. This can be achieved by in-cylinder late posts that generate heat to increase the exhaust temperatures, running the engine inefficiently, for example, at a high speed, or a combination of late posts and inefficient engine operation. The exhaust conditions can be modeled using the engine fueling map for warm operation, $FUEL_{warm}(\omega, \tau)$, and the exhaust gas temperature can be modeled as a function of $(\omega, \tau)$. The DOC inlet gas temperature can be modeled as a function of lat post injection fuel quantity.

Given the desired engine out power, the following quantities are determined: X=total fueling due to down shifting and meeting the remaining temperature target with lat post for heat; and Y=total fueling due to meeting the whole temperature target with late post for heat. The thermal management module 60 generates a low efficiency engine operation recommendation, such as a down shift operation and provided to the operator interface module 40 if it is determined that X is less than Y. Further, it is assumed that other heat generating devices, such as maneuvering a VGT, the use of intake air throttles, EGR cooler bypasses, etc. are all assumed to be unchanged between the scenarios X and Y.

FIG. 8 is a diagram illustrating more details of an exemplary DOC warm up module 800 that thermally manages the exhaust aftertreatment system 5 to bring the DOC to light-off temperature in accordance with an exemplary embodiment. As shown in FIG. 8, data indicative of at least one current vehicle operating condition is received as an input to an ENGINE $(\omega, \tau)$ calculating module 812. The operating condition data includes data signifying or representing current transmission out power, $POWER_t$, and current transmission speed or velocity out, $\omega_{out}$, current gear number, GEAR#, and data indicating the transmission gearing set, GEAR SET. The ENGINE $(\omega, \tau)$ calculating module 812 determines the engine speed $\omega$ and engine torque $\tau$ at the current gear (GEAR#) as ENGINE $(\omega, \tau)$ (NO SHIFT) and at a down shifted gear as ENGINE $(\omega, \tau)$ (DN SHIFTED).

The calculated values for ENGINE $(\omega, \tau)$ (NO SHIFT) and ENGINE $(\omega, \tau)$ (DN SHIFTED) are provided along with data $FUEL_{warm}(\omega, \tau)$ from engine fueling maps at "warmed up" conditions to a table-based fuel consumption interpreter module 814, which determines fueling, $FUEL_t$ (NO SHIFT), required based on speed and torque for the no shift operating condition and fueling, $FUEL_t$ (DN SHIFTED), required for the down shifted operating condition. The fueling maps can be obtained from, for example, memory of the ECM 6 or from storage elsewhere in the system network 15 or from remote storage. The fueling data based on warm conditions can originate from an engine fueling map module (not shown), which is part of the ECM or separate from, but communicably coupled with the ECM and other modules of the engine system 1.

The calculated values for ENGINE $(\omega, \tau)$ (NO SHIFT), ENGINE $(\omega, \tau)$ (DN SHIFTED), $FUEL_t$ (NO SHIFT), and $FUEL_t$ (DN SHIFTED) are provided to the expected exhaust temperature determination module 816, which determines an expected exhaust temperature at a later time increment $\Delta t$ for both the shifted and non-shifted conditions in view of the operating condition data and the fueling maps, for example, utilizing one of several known physics and known regression based concepts existing in the literature. The expected exhaust temperature determination module 816 provides output $T_{(t+\Delta t)}$ (NO SHIFT) value as the expected exhaust temperature at time $t+\Delta t$ for the non-shift (i.e. GEAR#) condition and the output $T_{(t+\Delta t)}$ (DN SHIFTED) value as the expected exhaust temperature at time $t+\Delta t$ for the down shifted condition.

The calculated expected temperature values are provided to a late post fuel calculator module 818 that utilizes an energy-based model and can include turbine and pipe losses, as described above with respect to the SCR warm up/DPF regeneration module 200. Also provided to the dosing fuel calculator module 818 is a temperature target $T_{target}$, engine speed $\omega$ (DN SHIFTED) related to the shifted condition, engine speed $\omega$ (NO SHIFT) related to the non-shifted condition to help compute the exhaust flow, as inputs to determine the dosing fuel required to reach the target temperature $T_{target}$. Other inputs can be provided as well to further refine the physics model. The late post fuel calculator module 818 outputs a value of late post fuel required for meeting $T_{target}$ in the down shifted operating condition $FUEL_t$ (DN SHIFTED LATE POST) and a value of lat post fuel required for meeting $T_{target}$ in the non-shifted operating condition $FUEL_t$ (NO SHIFT LATE POST). The target temperature data $T_{target}$ can originate from a target temperature module (not shown), which is part of the ECM or separate from, but communicably coupled with the ECM and other modules of the engine system 1.

The fueling values $Fuel_t$ (DN SHIFTED LATE POST) and $FUEL_t$ (NO SHIFT LATE POST) are provided along with the fueling values $FUEL_t$(DN SHIFTED) and $FUEL_t$(NO SHIFT) determined by the fuel consumption interpreter module 814 to a recommendation/benefit determination module 820, where a comparison is made between fueling required to reach $T_{target}$ using down-shifting plus, if required, fueling needed in meeting the remaining temperature target with dosing, and/against total fueling due to meeting the temperature target with dosing alone. Exemplary embodiments provide for the dosing to occur in-cylinder and to light-off in the DOC. Outputs of the recommendation/benefit determination module 820 include a transmission gear shift recommendation in view of the determined expected temperature changes based on optimization of overall fuel economy, and a benefit estimate. It is to be appreciated that the functions performed by recommendation/benefit determination module 820 can be carried out by more than one module, or submodules of the recommendation/benefit determination module 820. For example, the comparison between first and second exhaust temperatures relative to the target temperature can be contained and performed by a comparison module, and the transmission gear shift recommendation can be contained and performed in an optimization module.

Additionally, the expected exhaust temperature determination module 816 can determine more than two expected temperatures. For example, a first expected exhaust temperature can be determined based on a transmission down shift and higher engine speed in view of the operating condition data and the fueling maps, a second expected exhaust temperature can be determined based on a transmission down shift and higher engine speed coupled with fuel dosing, and a third expected exhaust temperature can be determined based on fuel dosing and non-shifted transmission. The recommended benefit determination module 820 can compare the first, second and third expected exhaust temperatures against the target temperature and provide a transmission gear shift recommendation in view of the compared expected exhaust temperatures based on an optimization of overall fuel economy. As above, the comparing and recommendation can be carried out using different modules.

Exemplary embodiments provide for the gear shift recommendation to be a down shift command. For example, in an exemplary embodiment, the recommendation/benefit determination module 820 will generate a down shift command or suggestion only if $[FUEL_t(DN\ SHIFTED)+FUEL_t\ (DN\ SHIFTED\ LATE\ POST)]<[FUEL_t(NO\ SHIFT)+FUEL_t\ (NO\ SHIFT\ LATE\ POST)]$ and is within system constraints.

Many aspects of this disclosure are described in terms of sequences of actions to be performed by elements of a controller, control module and/or a network system, which can be a computer system or other hardware capable of executing programmed instructions. These elements can be embodied in a controller of an engines system, such as the ECM 5, or in a controller separate from, and communicating with the ECM 5. In an embodiment, the controller and/or ECM can be part of a CAN in which the controller, sensor, actuators communicate via digital CAN messages. It will be recognized that in each of the embodiments, the various actions could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or software of the ECM and/or other controller or plural controllers. For example, the engine parameter/operating conditions module 20 can be implemented as separate modules for the engine parameters and current operating conditions. Logic of embodiments consistent with the disclosure can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional engine and turbine look-up tables and/or calibration parameters. The computer readable medium can comprise tangible forms of media, for example, a random access memory (RAM), a read-only memory (ROM), an erasable programmable read-only memory (e.g., EPROM, EEPROM, or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

Although a limited number of exemplary embodiments is described herein, one of ordinary skill in the art will readily recognize that there could be variations to any of these embodiments and those variations would be within the scope of the disclosure.

What is claimed is:

1. A method of managing vehicle engine/transmission systems to assist in thermal management of an engine aftertreatment DOC warm-up system, the method comprising:
   receiving data indicative of at least one current vehicle operating condition, said at least one current vehicle operating condition data including data signifying at least one of transmission out power and speed, current gear number, transmission gearing set, current engine temperature, current engine speed, current engine torque, and fueling;
   receiving data from engine fueling maps based on warm-up conditions; receiving a target temperature related to DOC light-off;
   determining a first expected exhaust temperature based on a transmission down shift and higher engine speed in view of said operating condition data and said fueling maps;
   determining a second expected exhaust temperature based on a transmission down shift and higher engine speed coupled with late post fuel injection;
   determining a third expected exhaust temperature based on late post fuel injection and non-shifted transmission;
   comparing said first, second and third expected exhaust temperatures against said target temperature; and
   providing a transmission gear shift recommendation in view of the compared expected exhaust temperatures based on an improvement of overall fuel economy.

2. The method of claim 1, wherein the transmission gear shift recommendation is a down shift command.

3. The method of claim 1, wherein the transmission gear shift recommendation includes a no shift command.

4. The method of claim 1, further comprising providing a benefit estimate based on the transmission gear shift recommendation.

5. The method of claim 1, wherein a Global Positioning System (GPS) provides information on route dynamics in utilizing the vehicle engine/transmission system to exploit passive increases in exhaust temperature in DOC system thermal management.

6. The method of claim 5, wherein the information on the route dynamics provided by the GPS includes a change in grade along the route.

7. The method of claim 5, where the method further comprises inhibiting active regeneration in response to an indication by the GPS of a passive increase in exhaust temperature.

8. The method of claim 1, further comprising:
   determining a fourth expected exhaust temperature based on a transmission up shift and lower engine speed in view of said operating condition data and said fueling maps; and
   comparing said first, second, third, and fourth expected exhaust temperatures against said target temperature.

9. The method of claim 1, wherein the transmission gear shift recommendation is an upshift command.

10. The method of claim 1, further comprising determining the target temperature related to DOC light-off.

11. A system adapted to manage vehicle engine/transmission systems to assist in thermal management of an engine aftertreatment DOC warm-up system, comprising:
   a vehicle operating condition module including data indicative of at least one current vehicle operating condition, said at least one current vehicle operating condition data including data signifying at least one of transmission out power and speed, current gear number, transmission gearing set, current engine temperature, current engine speed, current engine torque, and fueling;

an engine fueling map module including data from engine fueling maps based on warm-up conditions;

a target temperature module including a target temperature related to DOC light-off;

an expected exhaust temperature module containing:
- a first expected exhaust temperature based on a transmission down shift and higher engine speed in view of said operating condition data and said fueling maps,
- a second expected exhaust temperature based on a transmission down shift and higher engine speed coupled with late post fuel injection, and
- a third expected exhaust temperature based on late post fuel injection and non-shifted transmission;

a comparison module containing a comparison of said first, second and third expected exhaust temperatures relative to said target temperature; and an optimization module containing a transmission gear shift recommendation in view of said comparison of said expected exhaust temperatures, said recommendation being based on an optimization of overall fuel economy.

12. The system of claim 11, further comprising a Global Positioning System (GPS) module to provide information on route dynamics in utilizing the vehicle engine/transmission system to exploit passive increases in exhaust temperature in DOC system thermal management.

13. The system of claim 12, wherein the information on the route dynamics provided by the GPS includes changes in grade.

14. The system of claim 12 wherein the optimization module is configured to inhibit active regeneration in response to an indication by the GPS of a passive increase in exhaust temperature.

15. The system of claim 12, wherein the transmission gear shift recommendation includes a down shift command.

16. The system of claim 12, wherein the transmission gear shift recommendation includes a no shift command.

17. A system adapted to manage vehicle engine/transmission systems to assist in thermal management of an engine aftertreatment DOC warm-up system, the system comprising:
- a DOC warm up module configured to bring the DOC to a light off temperature, the DOC warm up module including:
  - a fuel consumption interpreter module:
    - configured to calculate a first fuel consumption resulting from a transmission downshift and
    - configured to calculate a second fuel consumption resulting from a no shift,
  - an expected exhaust temperature determination module:
    - configured to calculate a first expected exhaust temperature change for the transmission downshift and
    - configured to calculate a second expected exhaust temperature change for the no shift,
  - a late post fuel calculator module:
    - configured to calculate a first late post fuel amount for bringing the DOC to light off temperature for the transmission downshift and
    - configured to calculate a second late post fuel amount for bringing the DOC to light off temperature for the no shift, and
  - wherein the DOC warm up module is further configured to provide a down shift command.

18. The system of claim 17, wherein the DOC warm up module is further configured to provide a no shift command.

19. The system of claim 17, wherein the DOC warm up module is further configured to provide a benefit estimate.

20. The system of claim 17, wherein the DOC warm up module is further configured to calculate a third fuel consumption resulting from the transmission downshift and the first late post fuel amount for bringing the DOC to light off temperature for the transmission downshift.

\* \* \* \* \*